US010723572B2

(12) United States Patent
Baier et al.

(10) Patent No.: US 10,723,572 B2
(45) Date of Patent: Jul. 28, 2020

(54) DISTRIBUTION HEAD OF A GRAVIMETRIC LOADING SYSTEM FOR BULK MATERIALS

(71) Applicant: Zeppelin Systems GmbH, Friedrichshafen (DE)

(72) Inventors: Hermann Baier, Eriskirch (DE); Stefan Bier, Meckenbeuren (DE); Christiane Preiss, Aulendorf (DE); Amelie Vollmer, Friedrichshafen (DE); Guido Winkhardt, Aulendorf (DE)

(73) Assignee: Zeppelin Systems GmbH, Friedrichshafen (DE)

( * ) Notice: Subject to any disclaimer, the term of this patent is extended or adjusted under 35 U.S.C. 154(b) by 98 days.

(21) Appl. No.: 16/104,274

(22) Filed: Aug. 17, 2018

(65) Prior Publication Data
US 2019/0055096 A1  Feb. 21, 2019

(30) Foreign Application Priority Data

Aug. 17, 2017  (DE) .......................... 10 2017 118 750

(51) Int. Cl.
*B65G 69/04* (2006.01)
*B65G 65/32* (2006.01)
*B65G 67/06* (2006.01)

(52) U.S. Cl.
CPC ......... *B65G 69/0458* (2013.01); *B65G 65/32* (2013.01); *B65G 67/06* (2013.01); *B65G 69/0441* (2013.01); *B65G 2201/042* (2013.01); *B65G 2814/0288* (2013.01); *B65G 2814/0347* (2013.01)

(58) Field of Classification Search
CPC .... B65G 69/0458; B65G 65/32; B65G 67/06; B65G 69/0441; B65G 2201/042; B65G 2814/0288; B65G 2814/0347
USPC ......................................... 239/667, 681, 687
See application file for complete search history.

(56) References Cited

U.S. PATENT DOCUMENTS

| 3,064,833 | A |   | 11/1962 | Von Ruden |
| 3,539,113 | A | * | 11/1970 | Tyler .................... A01C 17/005 239/667 |
| 3,559,894 | A | * | 2/1971 | Murray .................. A01C 17/00 239/687 |
| 4,725,005 | A |   | 2/1988 | Wiegelmann |

(Continued)

FOREIGN PATENT DOCUMENTS

DE   35 42 340 A1   6/1986
DE     4438135 A1   5/1996
(Continued)

*Primary Examiner* — Steven J Ganey
(74) *Attorney, Agent, or Firm* — Browdy and Neimark, PLLC

(57) ABSTRACT

A distribution head of a gravimetric loading system for spreadable bulk materials with a rotatably driven spreader plate, which is composed of a bottom side base plate, which is connected in the central region with the one end of a drive shaft and on which a number of blades evenly distributed on the circumference and with their blade edges approximately in a radially outward direction is arranged. The blade edges of blades are interrupted in the direction of the central axial drive shaft and thus a ring channel extending in the axial direction and free from structures is formed, which channel forms an additional filling and receiving space for the bulk material to be distributed.

8 Claims, 8 Drawing Sheets

(56) References Cited

U.S. PATENT DOCUMENTS

Figure 1:
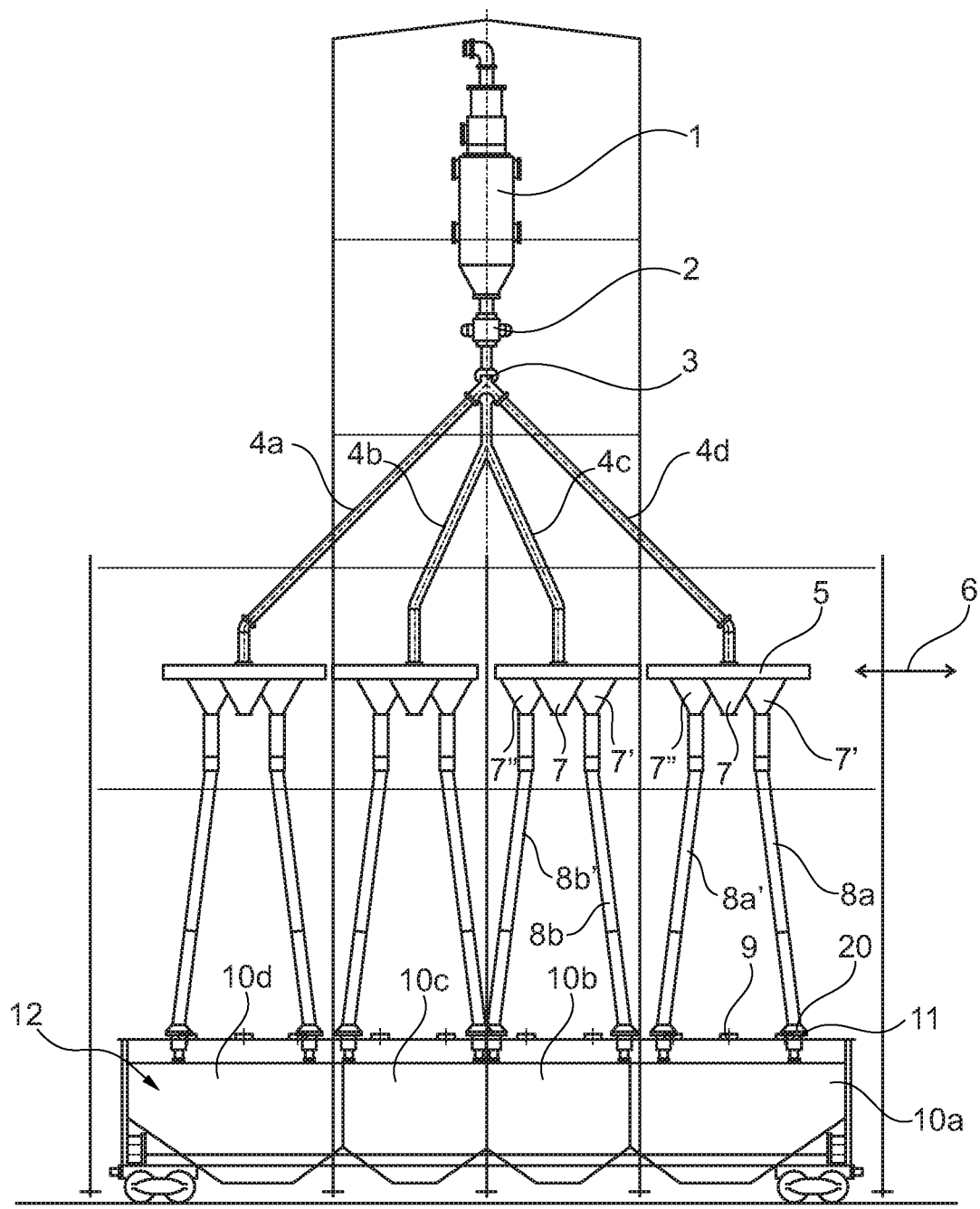

| | | | |
|---|---|---|---|
| 6,517,281 B1* | 2/2003 | Rissi | E01C 19/203 |
| | | | 239/667 |
| 6,726,131 B2* | 4/2004 | Berner | A01C 17/001 |
| | | | 239/687 |
| 7,104,478 B2* | 9/2006 | Niemela | A01C 15/14 |
| | | | 239/681 |
| 8,708,632 B2 | 4/2014 | Toline et al. | |
| 2009/0324372 A1 | 12/2009 | Hershberger | |
| 2016/0114341 A1 | 4/2016 | Hazelton | |

FOREIGN PATENT DOCUMENTS

| | | |
|---|---|---|
| DE | 20 2014 003 452 U1 | 6/2014 |
| DE | 20 2014 005 713 U1 | 8/2014 |
| EP | 0611264 A1 | 8/1994 |
| JP | H1135160 A | 2/1999 |

* cited by examiner

DISTRIBUTION HEAD OF A GRAVIMETRIC LOADING SYSTEM FOR BULK MATERIALS

The present invention refers to a distribution head of a gravimetric loading system for bulk materials.

Such a distribution head is known, for example, from the subject matter of US2016/0114341A1. The object of such a distribution head is to distribute in the most uniform way the spreadable bulk material which is filled onto the surface of the distribution head.

In said publication a spreader plate is shown, which, starting from a centered cone, which is positioned in the rotation axis of the spreader plate, is provided with radially outwardly directed blades, which are evenly distributed on the circumference.

However, such a spreader plate is less suitable for a uniform distribution of the bulk material in a container. Only an insufficient casting distance is obtained and the distribution of the bulk material in a filling container is not uniform. This is due to the fact that only a low throughput may be obtained, since a backpressure is generated in the bulk material above the plate, whereby an undesired filling column is formed on the rotatably driven plate, which causes a backpressure of the material to be distributed, and thus a degradation of the spreading capacity. Thus, the performance of the distribution of such a known spreader plate is limited.

By positioning a centered conical distribution body, there is a further drawback in that the inner radial space of the spreader plate, which directly surrounds the drive shaft, may not be available for the distribution of the spreadable material.

The conical body undesirably occupies the inner space of the spreader plate, which may be used for achieving an optimal distribution and which is not available for the distribution function. Therefore, the usable surface/used surface for distributing the spreadable material on the spreader plate is limited.

The subject matter of US2009/0324372A1 discloses another distribution head for a gravimetric loading system, in which rotably driven spreader blades are provided, on the radial outer side of which fixed distribution metal sheets are disposed. The spreader blades introduce the filling material distributed over the distribution sheets into the container.

Also, in this case the distribution performance is limited, since the fixed distribution sheets oppose the distributed filling flow and hinder a uniform distribution.

U.S. Pat. No. 3,064,833A1 describes a simple spreader plate with distribution blades, which are non-rotatably fixed on the spreader plate, and which extend, uniformly distributed over the circumference, on the rotatably driven base plate, are connected thereto and extend radially outwards. Also in this case the casting distance is limited, since the blades have no particular shape for increasing the casting distance and also the distribution capacity is very limited, since the blade inner side extend to the inner circumference of the drive shaft of the spreader plate and thus no usable inner axially extending ring gap is provided, into which additional filling material could flow for increasing the spreading performance.

Through the subject matter of DE202014005713U1 and DE202014003452U1 another distribution head of a gravimetric loading system for bulk materials is known, in which a spreader plate is provided, which has circumferential uniformly distributed blades, which are radially and outwardly curved along an arc.

Also, here there is the drawback that the blade inner edges extend up to the circumferential surface of the central axial drive shaft, so that the inner space, directly surrounding the central drive shaft, cannot be used for receiving additional bulk material.

The base plate described therein is conically shaped and the blades are extended on the conical or tapered base plate, with their inner edges reaching the central shaft. Therefore, there is a drawback in that the peripheral area around the central shaft is not available for an additional filling and distribution function.

The object of the invention is thus to develop a distribution head of a gravimetric loading system for bulk material in a way that provides a considerably better filling capacity with a more uniform distribution of the filling material and an optimization of the casting distance.

This object is achieved by a distribution head of a gravimetric loading system for spreadable bulk materials with a rotatably driven spreader plate, which is composed of a bottom side base plate, which is connected in the central region with the one end of a drive shaft and on which a number of blades evenly distributed on the circumference and with their blade edges approximately in a radially outward direction is arranged, characterized in that the blade edges of blades are interrupted in the direction of the central axial drive shaft and thus a ring channel extending in the axial direction and free from structures is formed, which channel forms an additional filling and receiving space for the bulk material to be distributed.

A characteristic of the invention is that the radially and inwardly directed edges of the blades are interrupted towards the central axial drive shaft thus forming an interspace, which is shaped like an axially extending continuous ring channel, which forms an additional filling and receiving space for the bulk material to be distributed.

Thus, the advantage is achieved that also the immediate circumferential area on the outer circumference of the central drive shaft may be used in a radially outward direction as an additional receiving space for the spreadable material. This means that a partial flow of the inflowing spreadable material drops downwards directly at the outer circumference of the central drive shaft until it reaches the height of the base plate and thus increases the absorption volume of the spreader plate.

This partial flow is used for improving the flying trajectory of radially outer partial flows, since the partial flow coming out of the inner circumference of the spreader plate is directed, according to the invention, outwardly and upwardly in an oblique direction, and is thus mixed with the other radially outwardly directed partial flows. Thus, the one additional radial inner partial flow is mixed into the other radial outward partial flows and accelerates the same, whereby the casting distance is increased.

Therefore, it is a completely new constructive configuration of a spreader plate, in which on the spreader plate a plurality of partial flows is formed and a central radially outwardly directed partial flow is now used for accelerating the other radially further outward lying partial flows and thus improving the casting distance.

The additional advantage is created, that the radial inner space of the spreader plate may be used as an additional filling space for filling the spreader plate, whereby an improved filling and absorbing capacity is obtained.

Thus the disadvantageous accumulation of bulk material in the form of an axial filling column forming over the spreader plate is avoided, since the bulk material drops in the circumferential area of the drive shaft, at the drive shaft, directly downwards in the direction of the base plate, and from there on, it is mixed in a radial outwards direction with a high acceleration into the further radially and outwardly directed partial flows.

Due to this mixing, the radially further outwardly formed partial flows are inherently accelerated, thus increasing the casting distance.

Due to the partial flow generated within the axial inner space, which flies radially outwards from the central area of the spreader plate, a rotating and flying base cushion of filling material to be distributed is formed, on which the other radially further outward lying filling flows rest and are radially carried away by the same base cushion. The inner partial flow forms a so called "flying carpet", on which the further outward generated partial flows are placed and carried away.

A considerable increase of the casting distance is thus achieved, since the radially outward forming partial flows are supported and carried by the inner radially inward formed partial flow.

According to a development of the invention, the blade edges of the blades directed against the filling flow, are not centrally positioned and do not intersect the central longitudinal axis of the spreader plate, but are eccentrically offset from this longitudinal central axis.

Thus, an improved efficiency in relation to the spreading capacity is obtained, since the central inner ring channel for forming the inner partial flow generally increases the filling volume of the spreader plate, which would not be possible in case of a continuous radial connection between the blade edges and the central drive shaft of the spreader plate.

For this reason, in an embodiment the eccentric form of the blade edges with respect to the longitudinal central axis of the spreader plate is preferred although the invention is not limited thereto.

In another embodiment the radially inwards directed blade longitudinal edges, which protrude into the inflowing filling flow, intersect the centered longitudinal central axis of the spreader plate.

Due to the radial offset of the blade edges in the direction of the longitudinal central axis of the spreader plate, the filling flow inflowing in the axial direction in alignment with the longitudinal central axis of the rotating plate already impinges with a radial offset on the radially offset formed blade edges and thus improves the spreading capacity.

In a preferred embodiment of the invention, the radial offset of the blades is directed in the direction of the longitudinal central axis in such a way that the radially inward directed blade edges are tangentially provided with a radial offset with respect to the central drive shaft of the spreader plate.

In a development of the invention, the partial flow formed in the central area extends to the base plate of the spreader plate and on this bottom a radially outward directed elevated ramp is formed, on which the central inner partial flow impinges and is lifted in a radial outward direction—in order to increase the casting distance.

This means that this partial flow does not leave the spreader plate in a radial direction and in a horizontal plane, but obliquely upwards in the direction of the lid of the filling container.

This is advantageous in that the oblique upwardly directed partial flow engages the other radially further outward formed partial flows from beneath and supports them like a cushion and thus carries the other granular particles, so that the casting distance and the casting height are increased.

This means that a supporting cushion for the other partial flows, which are formed further outward on the spreader plate, is obtained and on the other hand, that by the oblique upward and outward directed central partial flow the casting distance is additionally increased, since these are directed obliquely upwards.

The newly developed spreader plate is thus formed by a distribution plate, on which a total of four blades is attached. The securing is preferably obtained by welding.

These spreading blades form a respective tangential distance from the keyway on the side of the drive shaft and are directed at an angle of 90° to each other.

However, the invention is not limited to four blades. Three or five or any number of blades may be used that is higher than three.

Ramp-like distribution tracks are formed on the blades, and in a preferred embodiment, the ramps are approximately 30 mm high.

The radial length of the distribution tracks is approximately 80 mm. The distribution tracks are cropped and beveled. Due to the formation of a central inner ring channel, which is formed in that the radially inner edges of the blades do not extend to the central axis, a ring channel free from structures is formed which is filled with the bulk material and thus ensures a better filling capacity of such a spreader plate.

In a preferred embodiment it is also foreseen that the product flow inflowing in an axial direction onto the spreader plate is directed, in the area of an inner conical tube, onto the spreader plate, wherein the cone is directed towards the center of the spreader plate, in order to obtain a centering of the spreadable material on the spreader plate.

The inventive subject matter of the present invention is obtained not only from the subject matter of the individual claims, but also from the combination of the individual claims with each other.

All data and characteristics disclosed in the documents including the abstract, in particular the spatial configuration shown in the drawings, are claimed as relevant to the invention, as long as they are new, individually or in combination, with respect to the state of the art.

The invention is explained in the following by means of drawings which show only one way to put the same into practice. In particular, further characteristics and advantages of the invention may be obtained from the drawing and the corresponding description.

Figure 2:
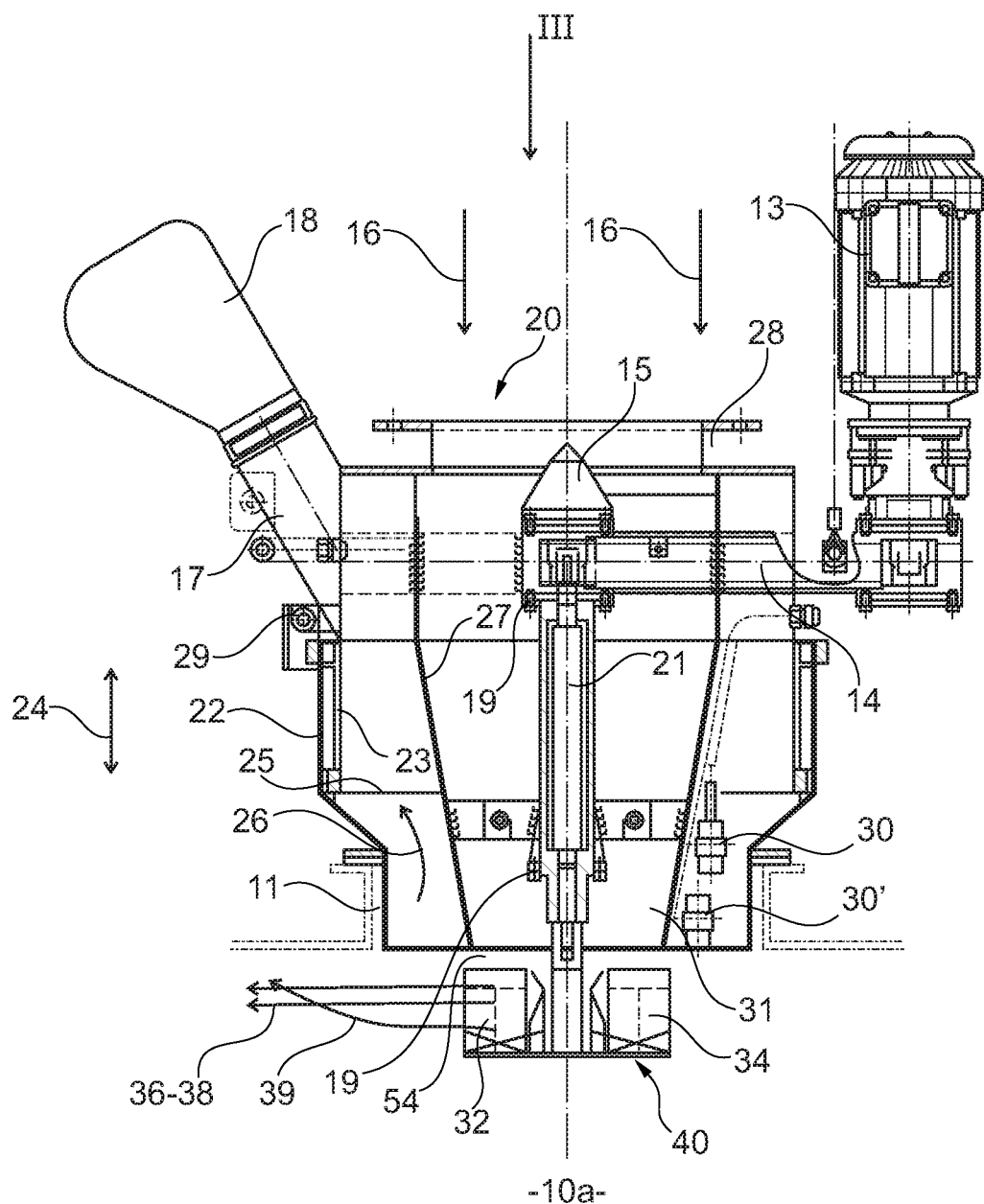
Figure 3:
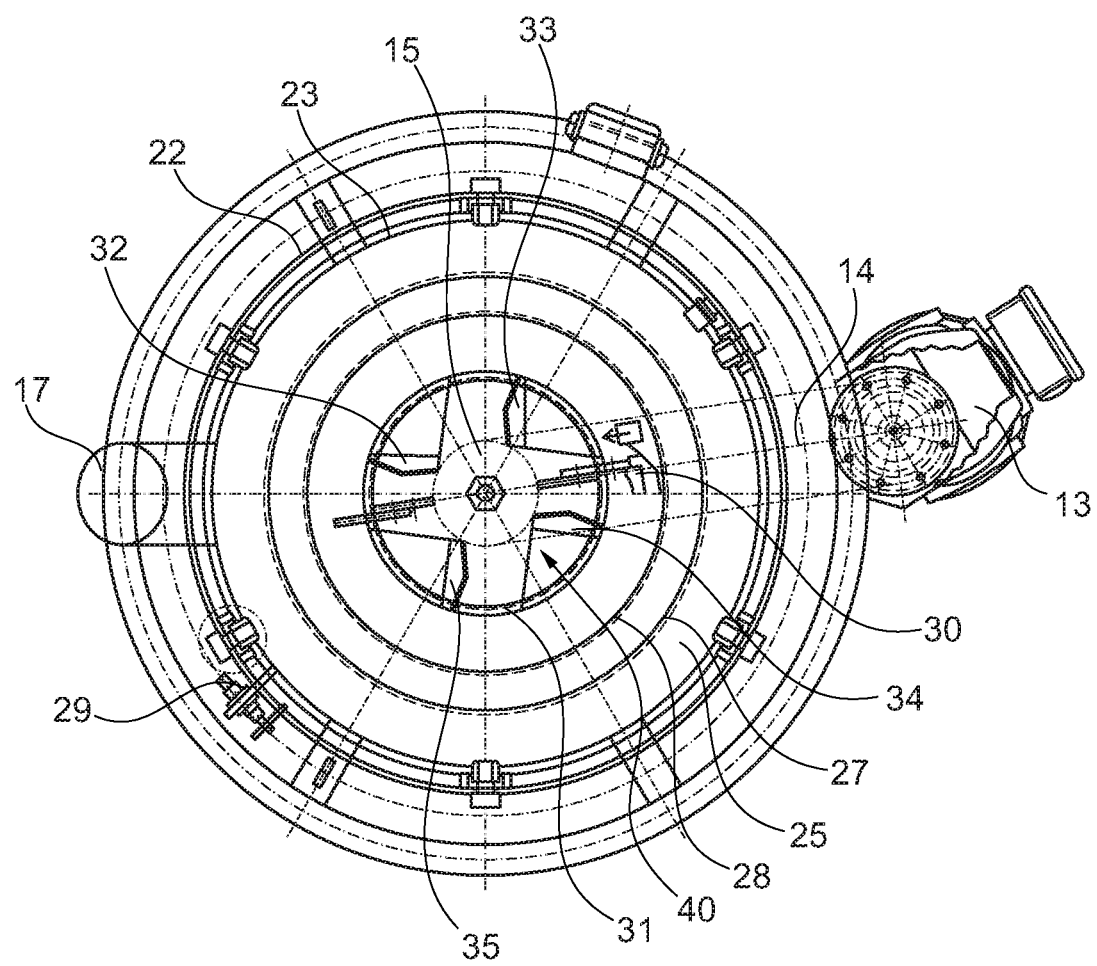
Figure 4:
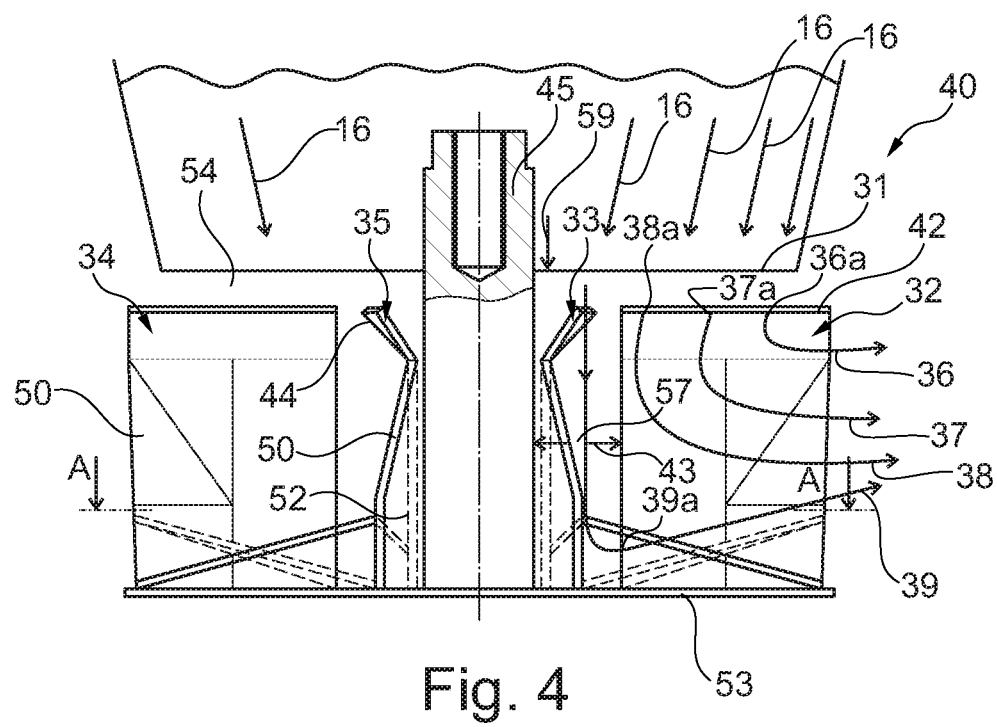
Figure 5:
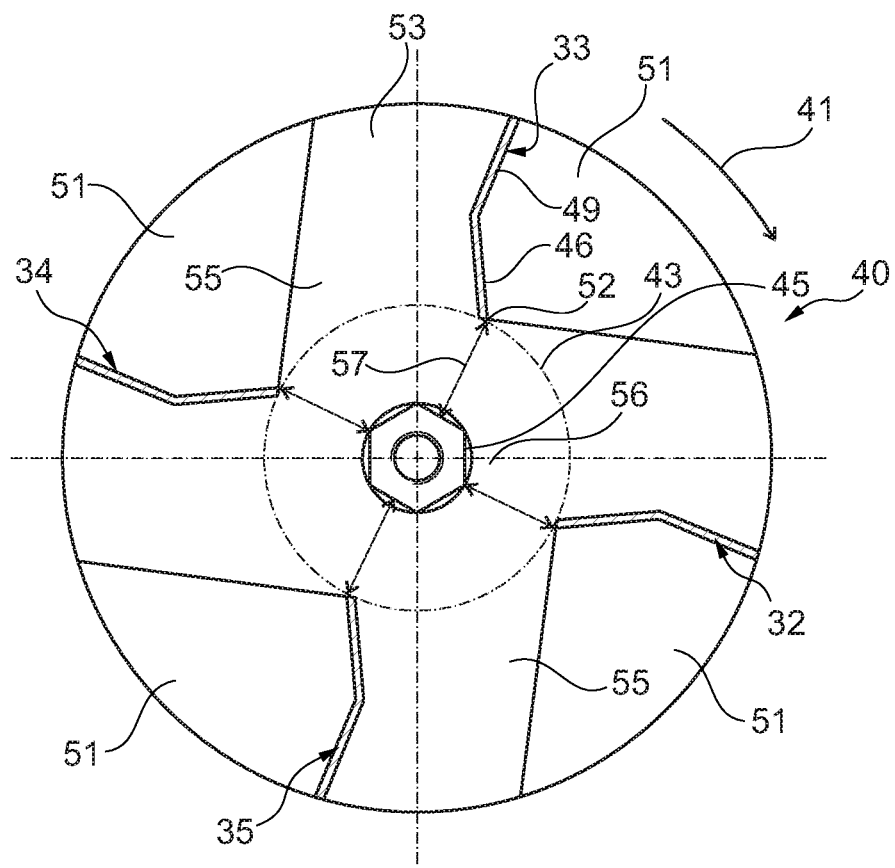
Figure 6:
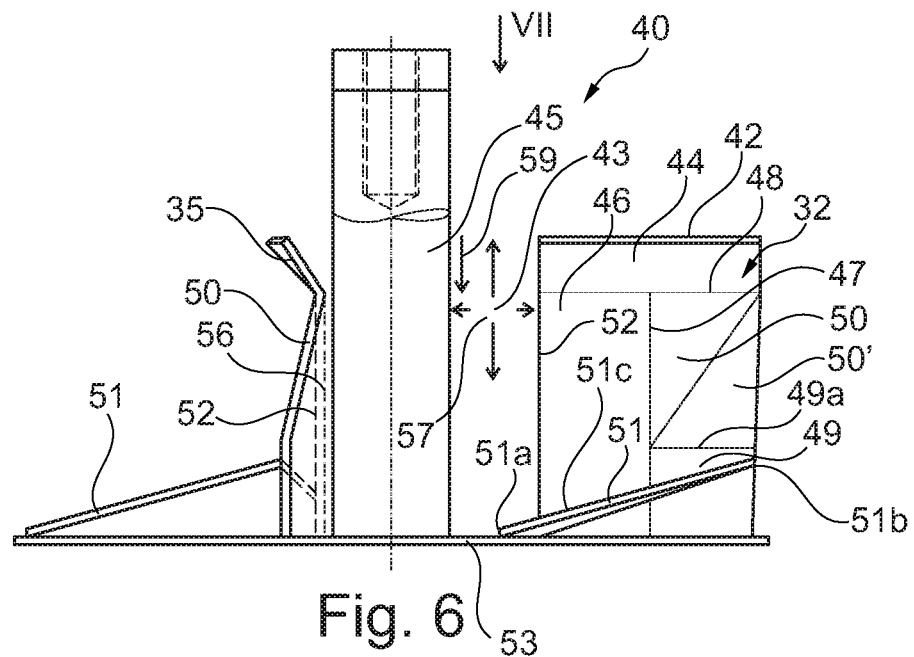
Figure 7:
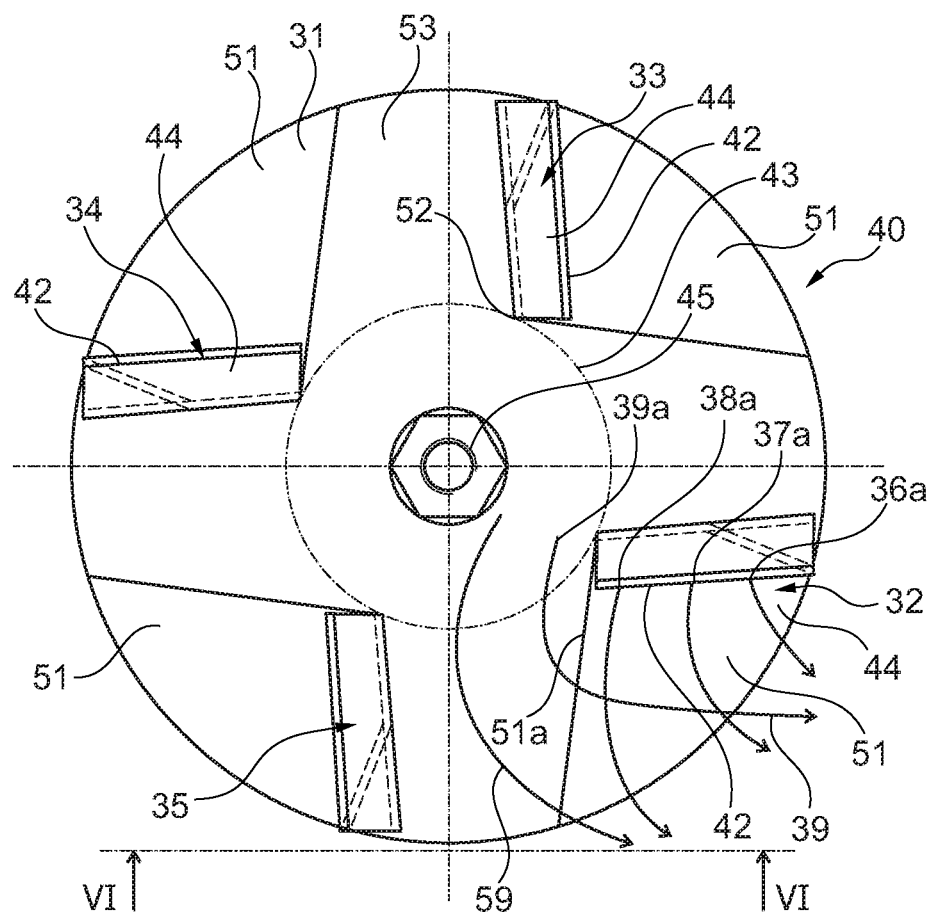

In particular:

FIG. 1 shows a schematic representation of a gravimetric loading system for bulk materials, FIG. 2 shows a cross-sectional view of a distribution head during the filling process in operating position, FIG. 3 shows a plan view of the arrangement in the direction of arrow III in FIG. 2, FIG. 4 shows a side view of a spreader plate, FIG. 5 shows a section along line AA in FIG. 4, FIG. 6 shows in the direction of the line VI-VI of FIG. 7 with a partial representation of the blades, FIG. 7 shows a plan view of the arrangement in the direction of arrow VII of FIG. 6, FIGS. 8-10 show various perspective representations of a spreader plate.

FIG. 1 generally shows a gravimetric loading system for bulk materials, which is essentially composed of a container 1 containing the bulk material, and which is led via a cellular wheel sluice 2 or another closing member on a distributor 3.

The distributor 3 is connected to a number of distributor pipes 4a, 4b, 4c, 4d, and all distributor pipes open in a central moving unit, which is horizontally movable in the direction of arrows 6.

The moving unit 5 allocates, for each distributor pipe 4a-d, an associated inlet head 7, so that each distributor pipe 4 is connected to a respective inlet head 7 through a material fit.

For clarity, however, a plurality of inlet heads 7, 7', 7" is shown, representing different displaced positions of a single inlet head 7.

In the drawing it is not shown, that one end of a telescopic pipe 8a-b is connected on the outlet side to each inlet head 7, wherein the length of the telescopic pipe may be changed.

It is only shown that various telescopic pipes 8a-8b are provided and that each telescopic pipe is respectively connected with a material fit to an inlet head.

Each telescopic pipe 8 opens into an inventive distribution head 20, which in the example of FIG. 1 is applied on the opened dome lid opening 11 (see FIG. 2).

The filling container 10 in the example shown is a freight car, although the invention is not limited thereto. Any filling container 10a-d may be positioned in any transport container. One or more dome lids 9 are associated to the respective filling container 10a-d, and in the example shown in FIG. 1, it may be seen, that the filling of the filling container 10a may be accomplished either through the telescopic pipe 8a or through the telescopic pipe 8'a.

The positional representation of both telescopic pipes 8a, 8'a symbolically represents the maximally displaced positions of a telescopic pipe 8a. It may thus occupy either position 8a or the maximum other position 8'a.

It is not important for the invention that the moving unit 5 is provided with a displacement in the direction 6 of arrows. A rigid connection between the distributor pipes 4 and an associated inventive distribution head 20 may also be provided.

The filling occurs gravimetrically, i.e. the bulk material is supplied from the container 1 to the associated distribution head 20 only by gravity.

FIG. 2 shows the inventive distribution head 20 in its filling position. It is essentially composed of the outer pipe 22, which has a centering cone, with which the outer pipe 22 is centered on the dome lid opening 11. The connection area between pipes 22, 23 is sealed.

An inner conical pipe 27 is inserted radially inward, through which the filling flow 16 passes.

A ring channel 25, through which the air escaping from the filling container 10 escapes upwardly in the direction of arrow 26 and reaches a filter bag 18 through a venting sleeve 17, is formed on the outer circumference of the inner conical pipe 27 in the direction of the inner circumference of pipes 22, 23.

The rotating drive of the inventive spreader plate 40 is provided by a drive motor, which is connected on the outside to a flange plate 28 of the distribution head 20, and which rotatably drives, via a flat belt 14, the drive shaft 21 of the spreader plate 40.

The drive shaft 21 is rotatably supported in two separately positioned bearings 19, and is non-rotatably connected to the spreader plate 40.

In order to protect the drive shaft 21 against the inflowing filling flow 16, a tapered covering cone 15 is provided.

The inner conical pipe 27 has a restricted supply channel 31, which is exactly centered on the spreader plate 40.

The diameter of the supply channel 31 is smaller than the outer diameter of the spreader plate, as in particular shown in FIG. 3 and FIG. 4.

Between the inner pipe 23 and the outer pipe 22 a position sensor 29 is positioned, which detects the mutual displacement of both pipes and thus determines whether the distribution head 20 is in its centered operating position on the dome lid opening 11 of the filling container 10a and the spreader plate 40 is free.

Moreover, on the outer circumference of the inner conical pipe 27 a filling level transducer 30 is positioned, which is shown in FIG. 2 in two different positions 30, 30'. Its optical viewing axis looks into the inner space of the filling container 10a passing along the spreader plate 40 and determines the fill level in the filling container.

This is preferably a capacitively operating fill level transducer 30.

The inventive spreader plate 40 in the example is preferably composed of four tangential and eccentrical blades 32, 33, 34, 35, which are offset with respect to the longitudinal central axis of the drive shaft 21, and which generate partial flows separate from each other, as schematically shown in FIG. 2.

It is important that in the circumferential area of the drive shaft 21, a ring channel 43 is formed, which is filled with filling material—in addition to the state of the art—, and which generates a partial flow 39 of spreadable material, which is directed obliquely outwards and upwards, as shown in FIG. 2.

This oblique outwardly and upwardly directed partial flow 39 engages the radial further outward formed partial flows 36-38 from beneath, thus forming a supporting cushion for partial flows 36-38 and increasing the spreading distance.

This is new and was not known in previous known spreader plates.

Moreover, between the lower edge of the supply channel 31, which is formed through the inner conical pipe 27 and the upper side of the spreader plate 40 a transition gap 54 is formed, through which the inflowing filling flow 16 freely flows and thus impinges from above axially on the spreader plate 40.

FIG. 3 shows a plan view of the arrangement of FIG. 2, where same parts are provided with the same reference numeral.

It may be recognized that the outer diameter of the spreader plate 40 is chosen larger than the inner diameter of the inner conical pipe 27 in the region of the supply channel 31, in order to ensure that a centered concentrated filling flow 16 from the inner conical pipe 27 is generated.

In FIGS. 4-7, an inventive spreader plate 40 is shown in detail, wherein different sections are provided for clarifying the operation.

Initially, Figures show that the spreader plate shaft 45 extends as a round profiled shaft to the base plate 53 of the spreader plate 40 and is there connected thereto in a non-rotatable way.

The individual blades 32-35 form radially inwards with their vertical blade edges 52 a radial distance 57 in the direction of the outer circumference of the spreader plate shaft 45, so that—around the outer circumference of the shaft of the spreader plate 45—a ring channel 43 is formed, which axially extends over the entire height of the spreader plate 40, and which forms according to the invention an additional absorption volume for the filling flow 16 inflowing in that position, which was not known in the state of the art.

For this reason, the absorption volume of such a spreader plate 40 may be considerably increased with respect to the known embodiments, since in the state of the art, in the circumferential area of the spreader plate shaft, a distribution cone or another voluminous body is always placed, which prevents an additional absorption volume in this area.

FIG. 4 shows that initially the volume of the filling flow 16, which is directed in a centered way to the spreader plate is subdivided, according to the invention, in various partial flows, wherein these partial flows 36-39 are initially functionally separated from each other.

A respective different partial flow 36-39 is thus formed at the respective upper entraining edge 42 of the respective blade 32-35.

In the exemplary embodiment of FIG. 4, it may be recognized that on the radially outer side of the entraining edge 42 a first partial flow 36 is formed in that a part of the filling flow 16 occurs at an impingement point 36a of the entraining edge 42 and is deflected there in the horizontal direction, in order to form a radially outward directed partial flow 36.

A second partial flow 37 is formed by the impingement point 37a on the entraining edge 42 and is also deflected radially and outwardly, as explained by means of the following still to be described blade surfaces.

A third partial flow 38 is radially deflected at impingement point 38a on the entraining edge 42 and leaves the spreader plate in the radial direction.

It is now important that a further inner partial flow 39 is formed within the ring channel 43, wherein—corresponding to the previous description—no impingement point is present on the entraining edge 42 of a blade 32-35, while this partial flow 39 drops in the axial direction along the outer circumference of the spreader plate shaft 45 downwards and reaches the bottom of the base plate 53 on a bottom-side impingement point 39a, which deflects the partial flow 39 radially, obliquely and outwardly.

The oblique outwardly directed deflection occurs because at the impingement point 39a on the bottom side an oblique upwardly directed spreading ramp 51 is connected, on which the partial flow 39 (on the spreading ramp 51) is centrifuged outwardly and upwardly. The oblique partial flow 39, directed from the downside to the upside engages the other partial flows 36-38 from beneath, supports them and thus increases the flying distance and flying height of all particles which are centrifuged by the spreader plate 40.

The partial flow 39 thus forms a supporting cushion made of granular particles of the filling flow, which, as a so called "flying carpet", engages the other partial flows 36-38 from beneath, supports them and thus extends the spreading distance.

It is still to be noted that the radially most outward positioned partial flow 36 with its impingement point 36a experiences a shorter permanence on the spreader plate 40, than the inward partial flow 39 with its radial inwardly positioned partial flow 38a.

The casting distance of the outer partial flows 36 is thus relatively shorter than the casting distance of the radially inward directed partial flows 38, so that the partial flow 39 forming the supporting carpet supports the farthest flying and high accelerated partial flow 38, and this partial flow supports the less accelerated further partial flows 36.

When, in order to clarify the description, four different partial flows 36-39 are indicated, this is intended only to be illustrative. In reality a flow band is provided with a volumetric flow, so that partial flows are defined only in order to clarify the description.

FIG. 5 shows that the radially inward directed blade edges form a tangential edge 55, which forms a distance 56 to the outer circumference of the spreader plate shaft 45. They are thus offset with respect to the center of rotation of the spreader plate shaft 45. Thus, the filling volume of the ring channel 43 is increased.

The ring channel according to FIG. 5 is formed by the radial distance 57, which is formed from the outer circumference of the spreader plate shaft 45 to the inner edge (blade edge 52) of the respective blade 32-35.

It is to be noted that in FIG. 5, the direction of rotation of the spreader plate is indicated in the direction of arrow 41.

The entraining edge 42 forming the impingement points 36a-38a of the respective blade 32-35 is connected, in the axial direction, downwards an entraining surface 44, which is obliquely offset with respect to the central longitudinal axis of the spreader plate shaft 45.

In order to simplify the description, only the structure of a single blade 32 is described, since all blades 32-35 are formed exactly in the same way and have the same configuration. The description of a blade 32 is thus also valid for all other blades. In another embodiment, however, also a 2×2 arrangement with different blade shapes could be present.

An entraining surface 44, which in FIG. 4 is shown as directed obliquely in the outward direction, is connected axially to and originates from beneath the horizontal entraining edge 42 (see FIG. 6).

The oblique outwardly directed entraining surface 44 is used for additional acceleration of the flow, which leaves the spreader plate in the radial direction.

A vertical blade edge 52 is provided, which inwardly delimits the respective blade 32 and represents the radially outwardly directed delimitation of the inventive ring channel 53.

The partial flow 59 is intended to be the furthest radially inner centered partial flow 39, which according to FIG. 6 impinges directly on a flat surface of the bottom plate 53, while the radially further outwardly positioned part of the partial flow impinges in the ring channel 53 on the initial part of the spreading ramp on the edge 51a and is accelerated in a radial outward direction over the spreading edge 51 by this edge 51a.

A vertical blade surface 46, which is delimited radially outwardly by a vertical delimitation line 47, is connected axially and from beneath to the entraining surface 44.

A transition region 50 is provided, which is directed radially outwards from the vertical delimitation line 47 and which is formed by an oblique transition region 50 formed by a further transition region 50' which is obliquely angled with respect to the same.

The transition regions 50, 50' are adjacent to the blade surfaces 49, wherein the blade surface is delimited by an edge 49a. The upper delimitation is provided in the lower edge 48.

Instead of the blade shape shown herein of blades 32-35, which are composed of blade surfaces, which are angled to each other, also other blade shapes may obviously be used, which are not delimited from each other by straight edges, but have a spherical curvature.

The spreading ramp 51 has an edge 51a. The edge is directed obliquely outwards and is formed like a ramp and ends with a radially outward external edge 51b.

A transition region 51c exists on the spreading ramp 51, which improves the spreading effect of the spreading ramp 51 due to a spherical or arcuate surface.

Figure 10:
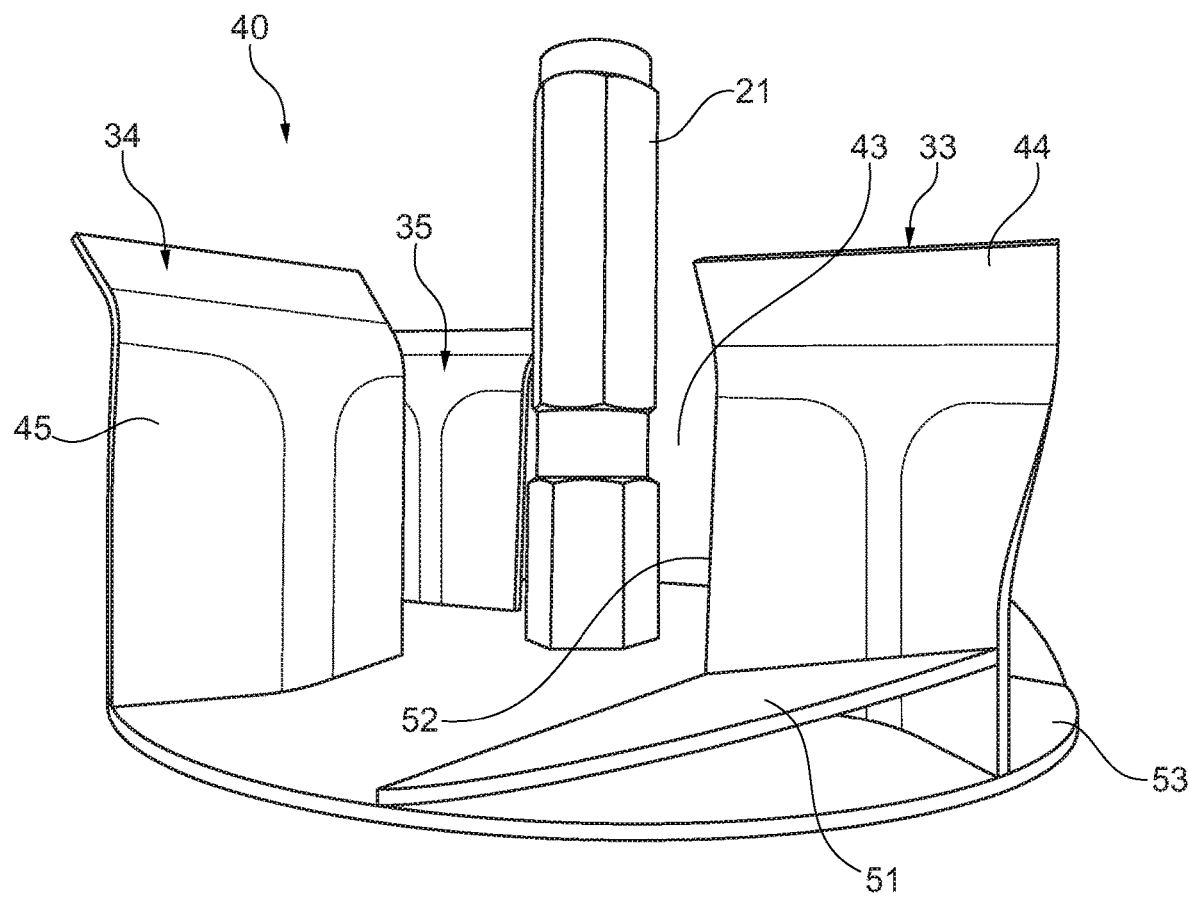

According to FIG. 10, it is formed by a cut-out metal sheet, which has an approximately triangular shape and abuts flush with its radial edge 51c on the vertical entraining surface 44 of the respective blade 32-35 and rises from radially inside to radially outside. The radially inner edge 51a extends from the vertical blade edge 52 obliquely outwards (see FIG. 8) towards the outer circumferential edge of the base plate 53. The radial inner delimiting edge of the spreading ramp 51 is thus adjacent to the inner vertical blade edge 52, so that the radially inner space of the spreader plate 40 is free from structures—towards the spreader plate shaft 45.

Therefore, the spreading ramp 51 is a triangular sheet metal cutout, which is in an oblique plane above the plane of the base plate 53 and is connected thereto and only the edge of the metal sheet cutout adjacent to the vertical blade edge 52 rises obliquely over the plane of the base plate 53 in a radial direction (see FIG. 10).

Figure 8:
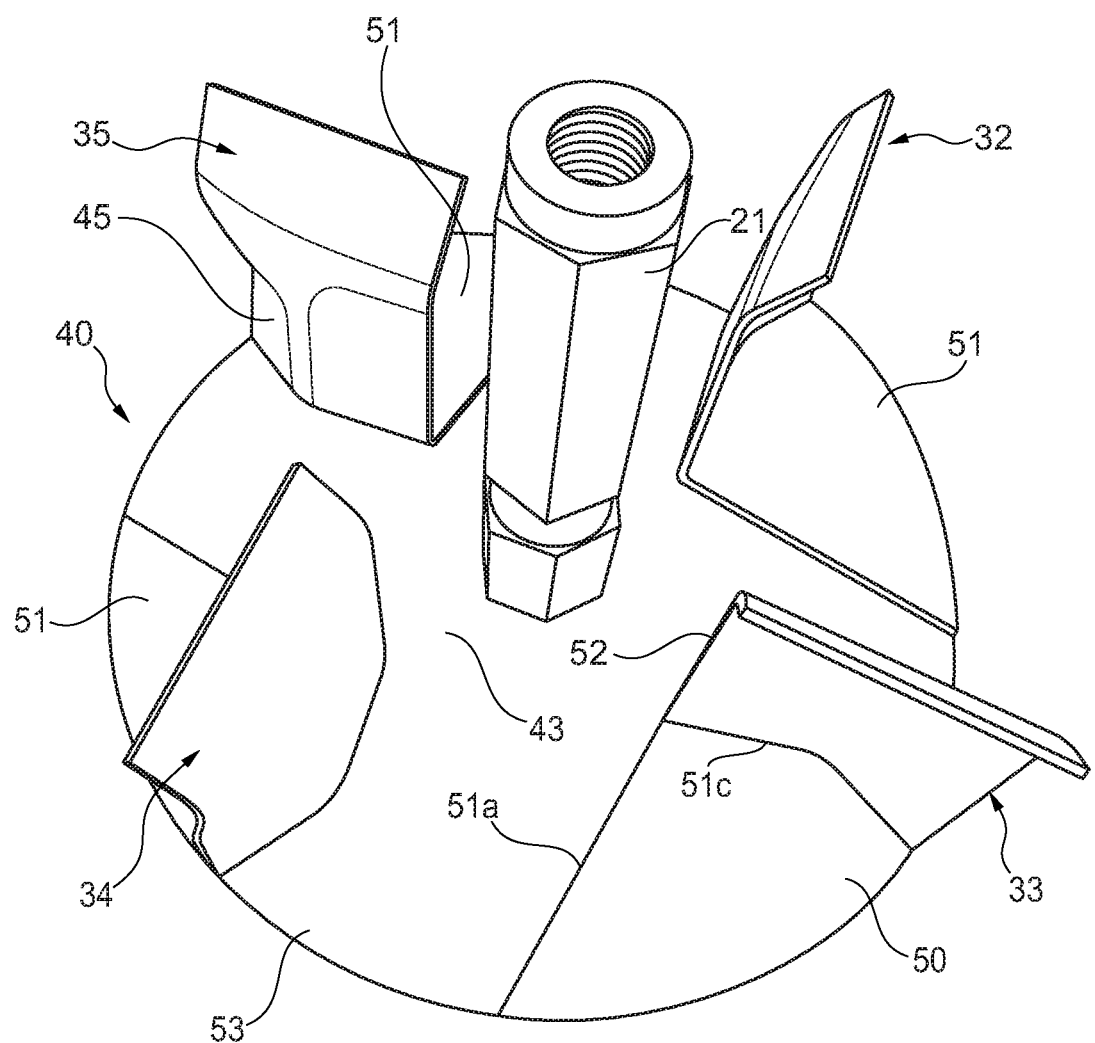
Figure 9:
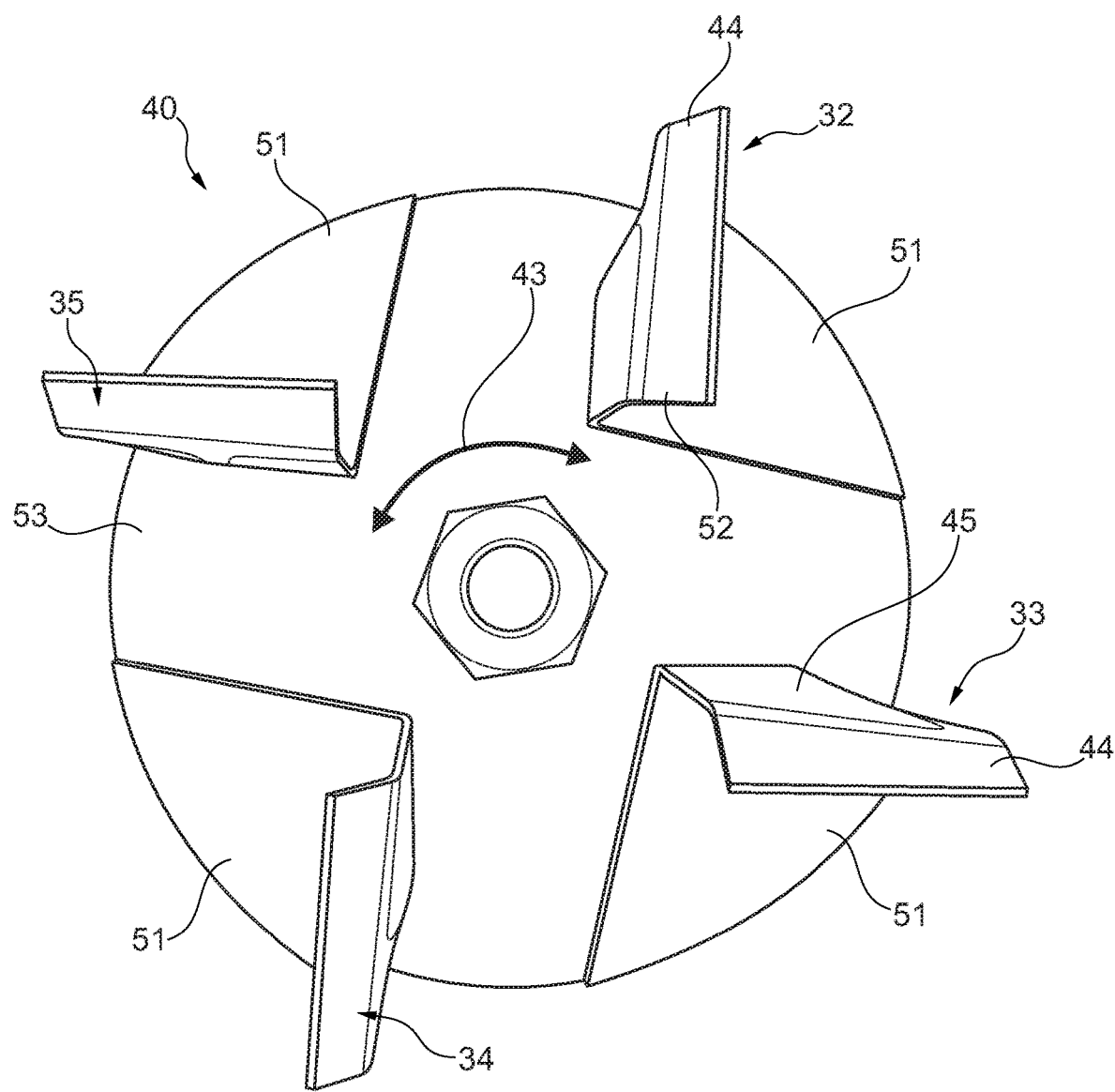

In FIGS. 8 to 10, the spreader plate 40 is shown from three different perspectives. The previous descriptions are also valid for the parts shown therein.

It may be recognized, that the blades 32-35 are made of relatively thin metal sheet cutouts, so that their volume does hardly reduce the axial filling volume (absorption volume) of the spreader plate 40. Similarly, the inner ring channel 43 formed in the radial circumferential region of the drive shaft 21 forms a large absorption volume for the filling material, which is flowing in an axial direction parallel to the drive shaft 21.

LEGEND OF THE DRAWINGS 1 container
2 cellular wheel sluice
3 distributor
4a distributor pipe
4b distributor pipe
4c distributor pipe
4d distributor pipe
5 moving unit
6 arrow direction
7 inlet head
8 telescopic pipe
8a telescopic pipe
8b telescopic pipe
9 dome lid
10 filling container
10a filling container
10b filling container
10c filling container
10d filling container
11 dome lid opening
12 freight car
13 drive motor
14 flat belt
15 covering cone
16 filling flow
17 venting sleeve
18 filter bag
19 bearing
20 distributor head
21 drive shaft
22 outer pipe
23 inner pipe
24 arrow direction
25 ring channel
26 arrow direction
27 inner conical pipe
28 flange plate
29 position sensor
30 filling level transducer
31 supply channel
32 blade
33 blade
34 blade
35 blade
36 partial flow a impingement point
37 partial flow a impingement point
38 partial flow a impingement point
39 partial flow a impingement point
40 spreader plate
41 arrow direction
42 entraining edge
43 ring channel
44 entraining surface
45 spreader plate shaft
46 blade surface (vertical)
47 delimitation line
48 lower edge
49 blade surface
49a blade surface
50 transition region
50a transition region
51 spreading ramp
51a edge
51b outer edge
51c transition region
52 blade edge
53 base plate
54 transition gap
55 tangential edge
56 distance (tangential)
57 radial distance
58 edge
59 partial flow

The invention claimed is:

1. A distribution head of a gravimetric loading system for spreadable bulk materials, the distribution head comprising:
a rotatably driven spreader plate the spreader plate comprising a bottom side base plate having a central region connected to one end of a central axial drive shaft and a plurality of blades evenly distributed on a circumference of the base plate, the plurality of blades having blade edges arranged approximately in a radially outward direction,
wherein the blade edges are interrupted in direction of the central axial drive shaft and comprise a ring channel extending in an axial direction and free from structures and providing an additional filling and receiving space for the bulk materials to be distributed,
wherein a plurality of partial flows is formed on the spreader plate and an inner central radially and outwardly directed partial flow accelerates other radially further outward positioned partial flows and improves casting distance and casting height of the plurality of partial flows.

2. The distribution head of claim 1, wherein the blade edges of blades are positioned with an offset, eccentrically with respect to the longitudinal central axis of the drive shaft and form a radial distance in the direction of the outer circumference of the spreader plate shaft.

3. The distribution head of claim 1, wherein a transition gap is positioned between a lower edge of an inlet channel, which is formed by an inner conical pipe and an upper side of the spreader plate, wherein an inflowing filling flow passing through the channel flows freely and thus impinges axially from above onto the spreader plate.

4. The distribution head of claim 1, wherein the plurality of partial flows having different directions is formed on a respective upper entraining edge of the respective blade.

5. The distribution head of claim 1, wherein an inner partial flow, which is directed obliquely outwards and upwards is formed in the axial free-standing ring channel.

6. The distribution head of claim 5, wherein a respective oblique and outwardly directed spreading ramp is arranged on a bottom of the base plate, which is associated with a respective blade, which, starting from a bottom-side impingement point, deflects the inner partial flow radially and obliquely outwardly and upwardly.

7. The distribution head of claim 1, wherein an entraining surface adjoins in an axial and downward direction the entraining edge of the respective blade, said entraining surface being obliquely offset with respect to a central longitudinal axis of a spreader plate shaft.

8. The distribution head of claim 1, wherein, starting from a horizontal entraining edge of each respective blade, an entraining underlying surface adjoins the horizontal entraining edge in an axial direction and said entraining underlying surface is directed obliquely towards an outside circumference of the spreader plate.

* * * * *